No. 678,077. Patented July 9, 1901.
G. E. WEBB.
FUEL SUPPLY CONTROLLER FOR HYDROCARBON ENGINES.
(Application filed Feb. 4, 1901.)
(No Model.)

Witnesses
C. F. Wesson
M. E. Regan

Inventor.
Geo. E. Webb.
By
Southgate & Southgate
Attorneys.

THE NORRIS PETERS CO., PHOTO-LITHO., WASHINGTON, D. C.

UNITED STATES PATENT OFFICE.

GEORGE E. WEBB, OF WORCESTER, MASSACHUSETTS, ASSIGNOR OF ONE-HALF TO JOHN J. ADAMS, OF SAME PLACE.

FUEL-SUPPLY CONTROLLER FOR HYDROCARBON-ENGINES.

SPECIFICATION forming part of Letters Patent No. 678,077, dated July 9, 1901.

Application filed February 4, 1901. Serial No. 45,836. (No model.)

*To all whom it may concern:*

Be it known that I, GEORGE E. WEBB, a citizen of the United States, residing at Worcester, in the county of Worcester and State of Massachusetts, have invented a new and useful Supply-Controller for Hydrocarbon-Engines, of which the following is a specification.

This invention relates to an improved construction for regulating the fuel-supply of an explosive-engine; and the especial object of this invention is to arrange the air-supplying connections for the cylinder of an explosive-engine so as to secure a regulation of the amount of fuel consumed by the engine by controlling or throttling one or more of the air-supplying channels for the cylinder.

To these ends this invention consists of the construction and combinations of parts, as hereinafter described, and more particularly pointed out in the claims at the end of this specification.

Figure 1:
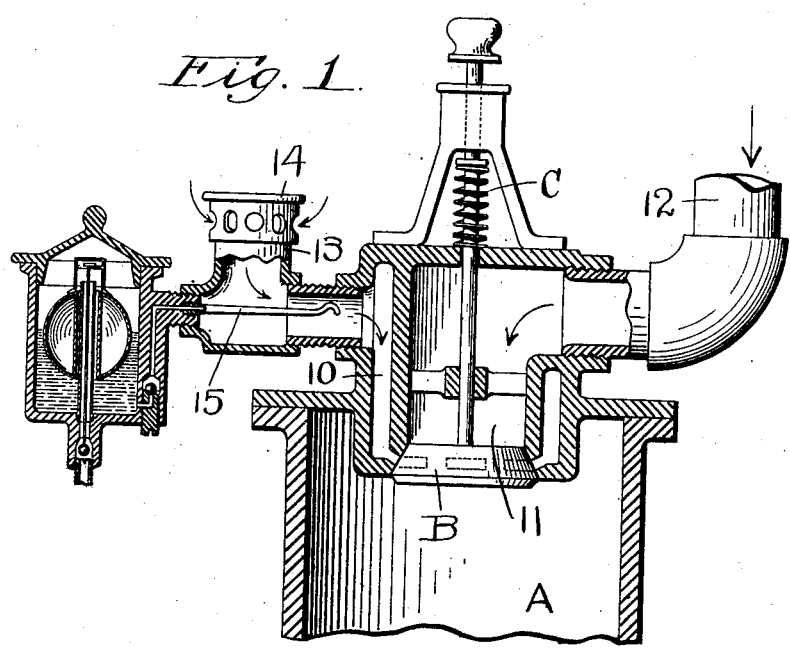
Figure 2:
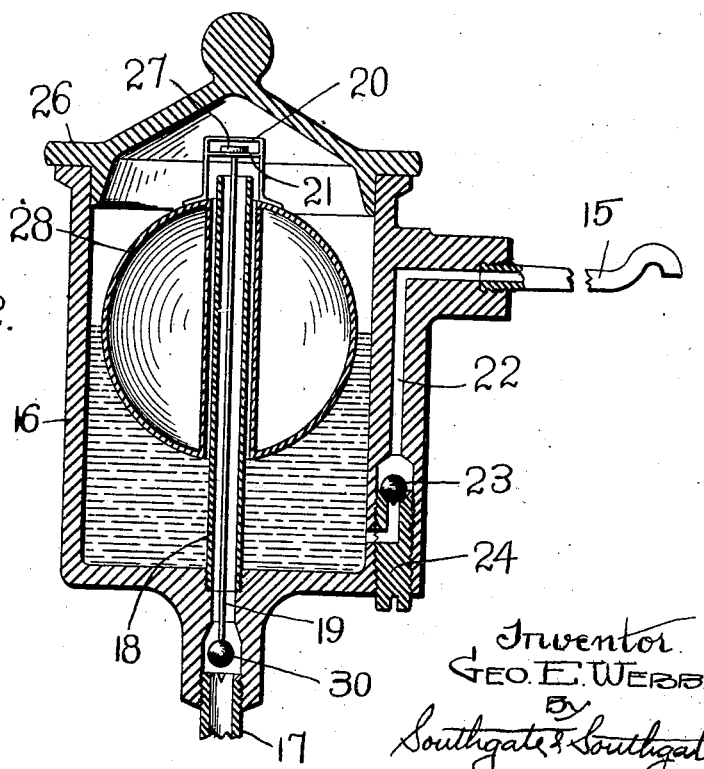

In the accompanying drawings, Figure 1 is a sectional view of a portion of the cylinder of an explosive-engine provided with controlling devices constructed according to this invention, and Fig. 2 is an enlarged sectional view of the fuel-reservoir and the means for maintaining a constant level therein.

One of the most difficult problems in the use of explosive-engines is to provide for the efficient and easily-adjusted control of the fuel-supply.

Heretofore in the use of that class of explosive-engines which employed gasolene or similar liquid fuel it has been customary to control the fuel-supply by the use of a small valve, ordinarily the fuel being controlled by a small pointed valve or needle-valve.

In practice I have found it impossible to secure an accurate regulation of the fuel-supply of an explosive-engine simply by the use of a needle-valve. This is due to the fact that even a slight change in the position of the regulating-valve will secure a comparatively wide variation in the amount of fuel consumed. For example, in many constructions I have found that a variation in the position of the needle-valve which is hardly perceptible will make a variation of several times the volume of liquid fuel consumed. To overcome this objection, many different constructions have been employed for securing a fine adjustment of the needle-valve; but even when adjusted with extreme accuracy and care I have found that needle-valves and similar means for directly controlling the fuel-supply of an explosive-engine are unsatisfactory on account of the delicacy and liability to wear of the parts, and, furthermore, such valves are rendered unreliable by the presence of even a small quantity of dust or grit.

The especial object of my present invention is therefore to provide means for regulating the fuel-supply of an explosive-engine which will entirely dispense with the use of a needle-valve or similar construction and in which the fuel-supply will be regulated by controlling the air channels and passages of the engine. To accomplish this object, an engine constructed according to my invention is provided with two or more independent air-supplying passages or connections. In one of the air-supplying passages I provide means for carbureting the air and I secure a control of the fuel-supply by regulating the relative proportions of each charge supplied to the cylinder through the air-passages. In practice I preferably leave the main air-channel or air-supplying pipe of the cylinder entirely free and unthrottled, so that a full supply of pure atmospheric air can be drown into the cylinder at all times, and I secure a control of the fuel-supply by regulating or throttling the amount of air which is drawn in through a supplemental or secondary air-passage, in which passage I provide means for carbureting the air which passes therethrough. The air from the main air-passage and the carbureted air from the supplemental air-passage preferably pass directly into the cylinder without being mixed together, the inlet-valve of the engine being preferably arranged to directly control the inlet both from the main air-passage and supplemental air-passage. To accomplish this purpose, the inlet-valve seat is preferably surrounded by an annular chamber which connects with the supplemental air-passage, while the main air-inlet opens directly to the center of the inlet-valve seat, and in practice I have found this to be an advantageous construction, as a comparatively small opening of the inlet-valve may thus be rendered sufficient to allow free ingress of the proper proportions of the charge for the cylinder, both from the main inlet-passage and from the supplemental inlet-passage. For carbureting the air in the supplemental inlet-passage I preferably provide a small carbureting-pipe, which is arranged horizontally and provided with a gooseneck or turned-up inner end. The oil or fuel is supplied to the carbureting-pipe from a reservoir, in which the oil is kept at a constant level, and a check-valve is provided for preventing back pressures, due to premature explosions, from forcing the oil back into the carbureting-pipe.

By using a small horizontal carbureting-pipe having a gooseneck or turned-up inner end, a construction is provided in which a supply of gasolene or other fuel is always kept in position for immediate use—that is to say, by means of this construction the small carbureting-pipe will be kept full of gasolene at all times, so that as soon as there is the slightest draft or flow of air through the supplemental inlet-passage the carbureting action will commence.

Referring to the accompanying drawings and in detail, A designates the cylinder of an explosive-engine. The opening into the upper end of the cylinder A is controlled by an inlet-valve B, which is normally held closed by a spring C. These parts may be of the ordinary or approved construction and need not be herein described at length. Surrounding the valve-seat of the inlet-valve B is an annular chamber 10, having openings directly controlled by the valve B, as indicated by dotted lines. Opening centrally through the valve-seat of the inlet-valve B is a main air-passage 11. The main air-passage 11 is supplied with air through a pipe 12, which is preferably left open or free and unthrottled, although any of the ordinary controlling devices may be employed therefor, if desired. Supplying air to the annular chamber 10 is a pipe 13, the admission of air to which is controlled or regulated by means of any of the ordinary dampers or throttling devices 14. By means of this construction when the inlet-valve B opens to permit the admission of a fresh charge to the cylinder A part of the charge will normally be drawn through the main air pipe or channel and part of the charge will be drawn in through the supplemental air pipe or channel. By regulating or adjusting the damper or throttling device 14 the proportions of a charge furnished to the cylinder A through the main air-passage and through the supplemental air-passage can be regulated or varied as desired.

To carburet the air supplied to the cylinder through the supplemental air-passage, I preferably employ a small carbureting-pipe 15, having a gooseneck or turned-up portion at its inner end, as shown. The connections which I employ for supplying oil or liquid fuel to the carbureting-pipe 15 are most clearly illustrated in Fig. 2. As shown in this figure, the pipe 15 is connected at its upper end to a reservoir or receptacle 16, having a removable cover 26. Oil or fuel under pressure is supplied to the bottom of the reservoir 16 through a pipe 17. Extending up inside of the reservoir 16 is a supply-pipe 18, and mounted inside the supply-pipe 18 is a vertical rod 19, carrying a ball or shut-off valve 30 at its lower end. Mounted upon and surrounding the vertical tube 18 is a ball or float 28, and carried by the ball or float 28 are bridge-pieces 20 and 21 for engaging a stop or button 27 on the upper end of the rod 19. By means of this construction when the float 28 rises the shut-off valve 30 will be positively lifted up to its seat, so as to shut off the supply of fuel to the reservoir, and when the float 28 falls the valve 30 will be positively opened to admit oil to the reservoir. By means of this construction the oil or fuel will be maintained at a constant level, which is preferably slightly below the height of the carbureting-pipe 15. The carbureting-pipe 15 is supplied through a channel 22, having a check-valve 23 near its lower end, which is secured in place by a plug 24. By means of this construction the slight suction caused by the passage of air through the supplemental air-passage will draw a small quantity of oil through the carbureting-pipe 15, so that all air passing through the supplemental inlet-passage will be carbureted or charged with gasolene or other vapor, and by regulating the proportions of the charge drawn through the supplemental air-passage I have provided for the efficient and readily-adjusted regulation of the fuel-supply without the use of a needle-valve or other positively-acting means of regulation.

When abnormal pressure is created by premature explosions or otherwise in the supplemental air-passage, the check-valve 23 will close, so as to prevent the oil or fuel from being forced back out of the carbureting-pipe 15—that is to say, by providing the carbureting-pipe 15 with a gooseneck or turned-up inner end and by controlling the passage for supplying gasolene or other fuel to the carbureting-pipe 15 by a check-valve I have provided a construction in which a small amount of gasolene or other fuel will always be stored or trapped in the carbureting-pipe 15, so that as soon as there is the slightest suction or flow of air through the supplemental horizontal inlet-passage the carbureting action will commence.

I am aware that numerous changes may be made in practicing my invention by those who are skilled in the art without departing from the scope of my invention as expressed in the claims, and while I prefer to regulate the proportions of each charge drawn into the cylinder from the main air-supply pipe and the supplemental air-supply by simply regulating and throttling the supplemental supply, thus leaving the main air-passage open and unobstructed, I am aware that other means may be employed for regulating and controlling the proportions of each charge for the cylinder supplied through said passages. I do not wish, therefore, to be limited to the construction I have herein shown and described; but What I do claim, and desire to secure by Letters Patent of the United States, is—

1. The combination of a horizontal inlet-passage for an explosive-engine, and means for carbureting the air passing therethrough, comprising a small pipe arranged horizontally in said passage, and having a gooseneck or turned-up portion at its inner end for keeping said carbureting-pipe full of gasolene or other fuel, substantially as described.

2. The combination of the cylinder of an explosive-engine, a horizontal air-supplying passage therefor, means for carbureting the air in said passage, comprising a small horizontally-arranged pipe therein having a gooseneck or turned-up portion at its inner end for keeping said carbureting-pipe full of gasolene or other fuel, a fuel-reservoir, connections for supplying fuel to said fuel-reservoir, and means for keeping the fuel at a constant level therein, substantially as described.

3. The combination of the cylinder of an explosive-engine, a horizontal air-supplying passage therefor, means for carbureting the air in said passage, comprising a small pipe arranged horizontally therein, having a gooseneck or turned-up inner end, and a check-valve controlling the inlet to said pipe, the parts being arranged, so that a small supply of fuel will be trapped or maintained in the horizontal pipe, substantially as described.

In testimony whereof I have hereunto set my hand in the presence of two subscribing witnesses.

GEORGE E. WEBB.

Witnesses:
LOUIS W. SOUTHGATE,
PHILIP W. SOUTHGATE.